US010261347B2

United States Patent
Yamazaki et al.

(10) Patent No.: US 10,261,347 B2
(45) Date of Patent: Apr. 16, 2019

(54) SYSTEM AND METHODOLOGY FOR CONTROLLING OPTICAL TRANSMITTANCE

(71) Applicant: Schlumberger Technology Corporation, Sugar Land, TX (US)

(72) Inventors: Shunsuke Yamazaki, Kanagawa-ken (JP); Shigeo Daito, Kanagawa-ken (JP); Shunsuke Fukagawa, Kanagawa-ken (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/828,489

(22) Filed: Dec. 1, 2017

(65) Prior Publication Data

US 2018/0173021 A1    Jun. 21, 2018

Related U.S. Application Data

(60) Provisional application No. 62/434,601, filed on Dec. 15, 2016.

(51) Int. Cl.
| | |
|---|---|
| *G01J 1/42* | (2006.01) |
| *G02F 1/01* | (2006.01) |
| *G02F 1/153* | (2006.01) |
| *G01V 8/02* | (2006.01) |
| *E21B 49/08* | (2006.01) |
| *G02F 1/157* | (2006.01) |

(52) U.S. Cl.
CPC .......... *G02F 1/0115* (2013.01); *E21B 49/088* (2013.01); *G01V 8/02* (2013.01); *G02F 1/1533* (2013.01); *G02F 1/157* (2013.01)

(58) Field of Classification Search
CPC .... G01J 9/00; G01J 1/4228; G01J 3/02; G01J 3/2803; G01J 3/36
See application file for complete search history.

(56) References Cited

U.S. PATENT DOCUMENTS

2017/0104426 A1*    4/2017    Mills .................... H02N 3/00

* cited by examiner

*Primary Examiner* — David Porta
*Assistant Examiner* — Mamadou Faye
(74) *Attorney, Agent, or Firm* — Eileen Pape

(57) ABSTRACT

A technique facilitates control over optical transmittance and, in some applications, the technique may be carried out without using moving mechanical parts. A system may comprise a light source and an optical fiber line, e.g. a plurality of optical fiber lines, in optical communication with the light source. An electrochromic device is positioned along each optical fiber line and may be selectively operated via electrical inputs to control optical transmittance along the corresponding optical fiber line. When plural optical fiber lines are employed, the corresponding plurality of electrochromic devices may be operated to also provide control over optical path selection. In fluid analysis operations, at least one sample chamber for receiving fluid samples may be positioned along a corresponding optical fiber line to enable analysis of light directed into the fluid sample as controlled by the corresponding electrochromic device.

18 Claims, 3 Drawing Sheets

SYSTEM AND METHODOLOGY FOR CONTROLLING OPTICAL TRANSMITTANCE

CROSS-REFERENCES TO RELATED APPLICATIONS

This application claims priority to U.S. Provisional Patent Application No. 62/434,601, filed on Dec. 15, 2016, which is incorporated in its entirety by reference herein.

BACKGROUND

Hydrocarbon fluids such as oil and natural gas are produced from subterranean geologic formations. Initially, a wellbore may be drilled into the formation and the formation may be evaluated by taking samples of formation fluids at various positions along the wellbore. The fluid samples may then be evaluated to determine a variety of characteristics related to the formation and the hydrocarbon fluid contained in the formation. In some applications, fluid analyzers are deployed downhole to collect data from the fluid samples as they are obtained. The fluid analyzers may be optical fluid analyzers which collect data on the fluid samples by directing light into the fluid samples and then detecting the spectrum of light transmitted or backscattered. The data obtained may be processed to determine desired information on the formation and the fluids contained in the formation. Optical fluid analyzers utilize an optical chopper combined with a motor to control optical path selection and measurement frequency. However, these moving mechanical components are subject to wear which can lead to subsequent failure and/or replacement.

SUMMARY

In general, a system and methodology are provided to facilitate control over optical transmittance and the methodology may be carried out without using moving mechanical parts. According to an embodiment, a system comprises a light source and an optical fiber line, e.g. a plurality of optical fiber lines, in optical communication with the light source. An electrochromic device is positioned along each optical fiber line and may be selectively operated via electrical inputs to control optical transmittance along the corresponding optical fiber line. When plural optical fiber lines are employed, the corresponding plurality of electrochromic devices may be operated to also provide control over optical path selection. In fluid analysis operations, at least one sample chamber for receiving fluid samples may be positioned along a corresponding optical fiber line to enable analysis of light directed through the fluid sample as controlled by the corresponding electrochromic device.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
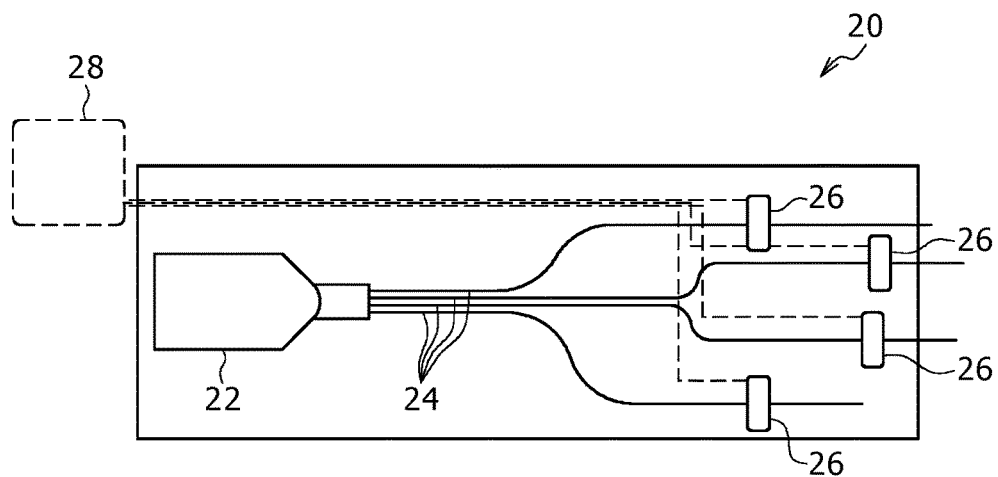
FIG. 1 is a schematic illustration of a system for controlling optical transmittance, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology to facilitate control over optical transmittance without using moving mechanical parts. The system and methodology are amenable to use in optical fluid analyzer tools, including optical fluid analyzer well tools deployed downhole into a borehole for evaluation of samples of reservoir fluid. In well applications, the optical fluid analyzer tool may be deployed to desired positions along the borehole to obtain fluid samples and to analyze those fluid samples to obtain data which can be used to evaluate the reservoir fluid as well as the surrounding formation. However, the system and methodology also may be used in various other applications which benefit from, for example, control over optical transmittance and/or optical path selection without using moving mechanical parts.

According to an embodiment, a system for controlling optical transmittance comprises a light source and an optical fiber line, e.g. a plurality of optical fiber lines, in optical communication with the light source. In various applications the light source emits light which is transmitted along the plurality of optical fiber lines, and the system may be operated to selectively block or allow transmittance of light along specific optical fiber lines, thus providing optical path selection. Control over the optical transmittance may be achieved with an electrochromic device positioned along each optical fiber line.

Each electrochromic device may be selectively operated via electrical inputs (without moving mechanical components) to control the optical transmittance along the corresponding optical fiber line. In fluid analysis operations, at least one sample chamber for receiving fluid samples may be positioned along a corresponding optical fiber line to enable analysis of light directed through the fluid sample. In this latter embodiment, the corresponding electrochromic device may be operated to control whether transmittance of the light to a corresponding sensor device, e.g. photodetector, is allowed.

In embodiments described herein, each electrochromic device is a device which may be controlled to cause a reversible color change effect, e.g. a reversible color change between transparent and opaque. For example, the electrochromic device may effectively be actuated between a substantially transparent state in which light is freely transmitted through the electrochromic device and a substantially opaque, e.g. reflective, state which blocks transmittance of light through the electrochromic device. By way of example, the electrochromic device may be in the form of an electrochromic mirror which may be effectively actuated between a state freely allowing transmittance of light therethrough and a state reflecting light and/or absorbed light so as to block passage through the electrochromic device. Each electrochromic device may be switched between these color states allowing or blocking optical transmittance via application of suitable electrical inputs, e.g. suitable electrical currents or electrical potentials, applied to the electrochromic device.

Referring generally to FIG. 1, an embodiment of a system 20 for controlling optical transmittance is illustrated. In this embodiment, system 20 comprises a light source 22 and at least one optical fiber line 24 placed in optical communication with the light source 22. As illustrated, the optical fiber line 24 may comprise a plurality of optical fiber lines 24 and each optical fiber line may be in the form of an optical fiber bundle for transmitting light emitted by light source 22. Depending on the application, the light source 22 may comprise an incandescent light source, a light-emitting diode (LED) light source, or another suitable light source for a given application.

According to the embodiment illustrated, at least one electrochromic device 26 is disposed along each optical fiber line 24. The electrochromic devices 26 may be controlled via suitable electrical inputs, e.g. electrical current inputs or electrical potential inputs, to cause changes in optical transmittance through the corresponding electrochromic device 26. For example, each electrochromic device 26 may be controlled via electrical inputs to effectively change color between a light transmitting state and a light blocking state. Control over the optical transmittance through each electrochromic device 26 enables optical path selection with respect to the transmittance of light along selected optical fiber lines 24. In some embodiments, the electrochromic devices 26 may be in the form of electrochromic mirrors which may be controlled to selectively allow transmittance of light or to reflect and thus block transmittance of light there through.

The system 20 also may comprise a control system 28 coupled with each electrochromic device 26. The control system 28 enables selective control over optical transmittance through the individual electrochromic devices 26 without moving mechanical parts. By way of example, the control system 28 may be a processor-based control system programmed or otherwise controlled to provide the desired electrical signals received as electrical inputs at the electrochromic devices 26. As a result, the control system 28 may be operated to provide the desired control over optical transmittance at each electrochromic device 26 and/or to enable desired optical path selection with respect to transmittance of light along the corresponding optical fiber lines 24, e.g. optical fiber bundles.

Figure 2:
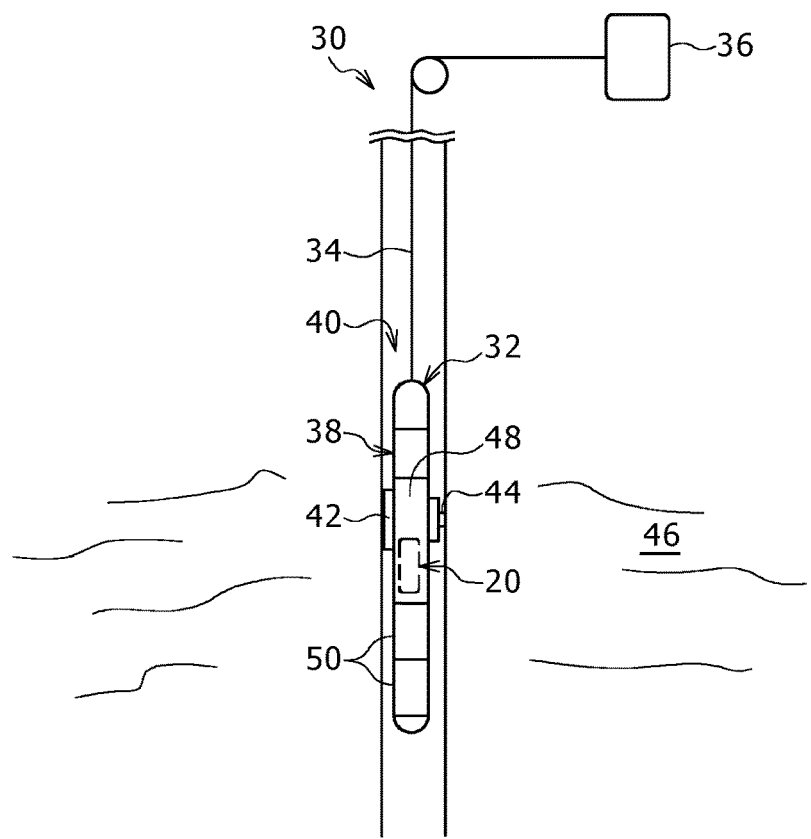
FIG. 2 is a schematic illustration of an example of a well system deployed in a borehole and including a fluid analyzer comprising a system for controlling optical transmittance, according to an embodiment of the disclosure.

The optical system 20 may be employed in a variety of tools for providing desired control over optical transmittance without moving mechanical parts. Referring generally to FIG. 2, for example, the optical system 20 is implemented in a well system 30. In this embodiment, well system 30 comprises a downhole well tool 32 containing optical system 20 and coupled with a communication cable 34. The communication cable 34 may be connected between well tool 32 and a surface system 36, such as a processing and control system for controlling downhole well tool 32 and for processing data received from the well tool 32. By way of example, the communication cable 34 may be in the form of a logging cable and well tool 32 may be a logging tool.

In some embodiments, well tool 32 may have an elongated body 38 constructed for movement along a borehole 40, e.g. a wellbore. The well tool 32 also may comprise control system 28, e.g. a downhole control system, used to control optical system 20. Depending on the application, control system 28 and the surface control system 36 may be combined or separate and may be located in whole or in part at a suitable downhole location, surface location, or both surface and downhole locations during operation of well tool 32. The control system 28 and/or surface control system 36 also may be used for processing data collected via optical system 20.

According to an embodiment, the well tool 32 also may comprise an anchoring mechanism 42 and a fluid intake assembly 44. The anchoring mechanism 42 may be selectively actuated against the surrounding borehole wall to move fluid intake assembly 44 into engagement, e.g. sealing engagement, with a portion of the borehole wall. By moving the intake assembly 44 into engagement with the surrounding borehole wall, a portion of the wall of borehole 40 may be isolated and fluid communication with a surrounding formation 46 may be established. In this manner, a fluid sample may be moved into a fluid analyzer 48 containing optical system 20. By way of example, the sample fluid may enter fluid analyzer 48 via application of negative pressure or by utilizing the natural pressure in the surrounding formation.

Depending on the application, the well tool 32 may comprise other components 50, such as additional logging components, sensors, fluid storage chambers, or other components 50 selected for a given operation. In this example, fluid samples may be drawn into fluid analyzer 48 at various positions along borehole 40 for analysis via optical system 20. The data resulting from the analysis may be sent to a suitable processing system, e.g. control system 28 and/or surface control system 36, for further analysis regarding characteristics of the reservoir fluid and/or the surrounding formation 46.

Figure 3:
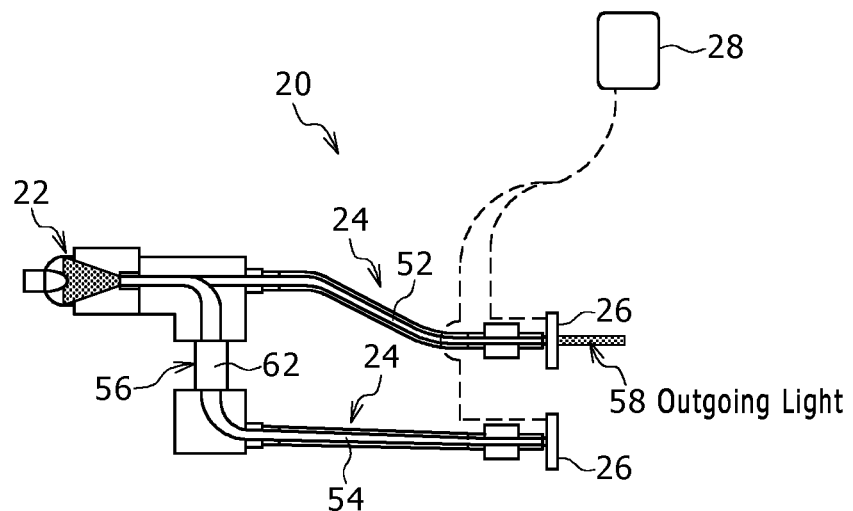
FIG. 3 is an illustration of an embodiment of a fluid analyzer comprising an optical system for controlling optical transmittance, according to an embodiment of the disclosure.
Figure 4:
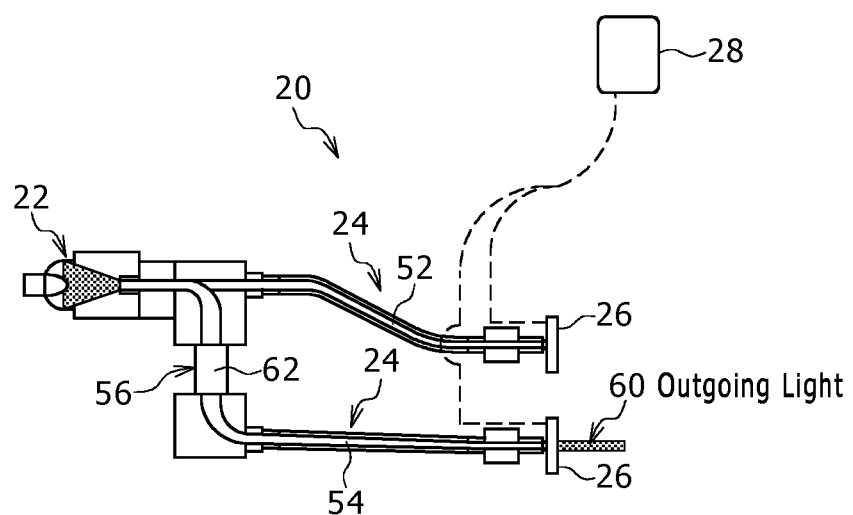
FIG. 4 is an illustration similar to that of FIG. 3 in which the optical system has been switched to a different operational configuration without the use of moving mechanical components, according to an embodiment of the disclosure.

Referring generally to FIGS. 3 and 4, an embodiment of optical system 20 for controlling optical transmittance is illustrated. The embodiment of FIGS. 3 and 4 is suitable for use in well tool 32 or in other types of tools. In this example, the optical fiber lines 24 are in the form of optical fiber bundles, such as a source fiber bundle 52 and an output fiber bundle 54. In some embodiments, the light source 22 may direct light into a common optical fiber line 24 which then splits into separate optical fiber lines 24, e.g. fiber bundles 52, 54.

In the embodiment illustrated, a sample chamber 56 is disposed along at least one of the optical fiber lines 24, e.g. along output fiber bundle 54. Depending on the embodiment, the sample chamber 56 may be located at various positions along the corresponding optical fiber line 24 on one side or the other of the corresponding electrochromic device 26 which is also positioned along the corresponding optical fiber line 24. In the example illustrated in FIGS. 3 and 4, the sample chamber 56 is positioned between the light source 22 and the corresponding electrochromic device 26. If the optical system 20 is implemented with well tool 32 and fluid analyzer 48, the sample chamber 56 is placed in fluid communication with intake assembly 44 so as to selectively receive fluid samples from the surrounding formation 46 for analysis.

As illustrated, at least one electrochromic device 26 is disposed along each optical fiber line 24 and may be controlled to allow or block transmittance of light via control system 28. The control system 28 may be operated to control optical path selection along the desired optical fiber line 24 by providing the appropriate electrical inputs to the corresponding electrochromic devices 26. In the example illustrated, the electrochromic device 26 disposed along output fiber bundle 54 has been actuated to act as a shutter and to block transmittance of light while the electrochromic device 26 disposed along source fiber bundle 52 has been actuated to allow transmittance of light and to permit outgoing light 58, as illustrated in FIG. 3.

However, the control system 28 may be operated to switch the electrochromic devices 26 to different configurations, such as the configuration illustrated in FIG. 4. In FIG. 4, the electrochromic device 26 disposed along source fiber bundle 52 has been actuated to act as a shutter and block transmittance of light while the electrochromic device 26 disposed along output fiber bundle 54 has been actuated to allow transmittance of light, thus permitting outgoing light 60. In this latter configuration, light emitted from the light source 22 passes through a fluid sample 62 in sample chamber 56 and through the corresponding electrochromic device 26 for analysis.

Figure 5:
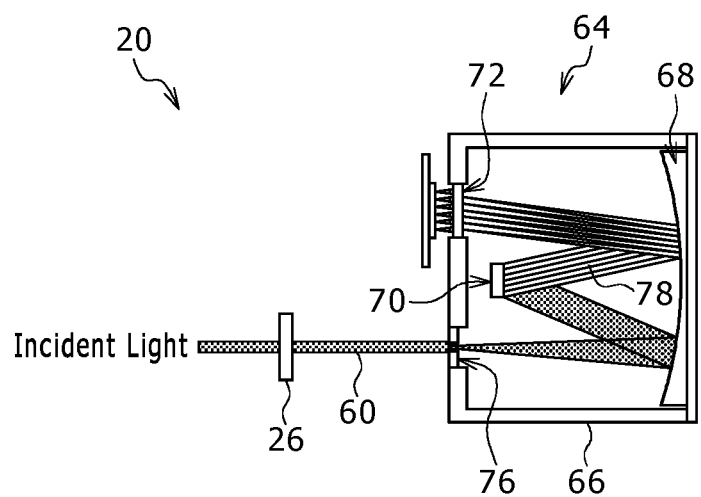
FIG. 5 is an illustration of an embodiment of a fluid analyzer combined with a sensor device able to evaluate the spectrum of light transmitted through a fluid sample, according to an embodiment of the disclosure.
Figure 6:
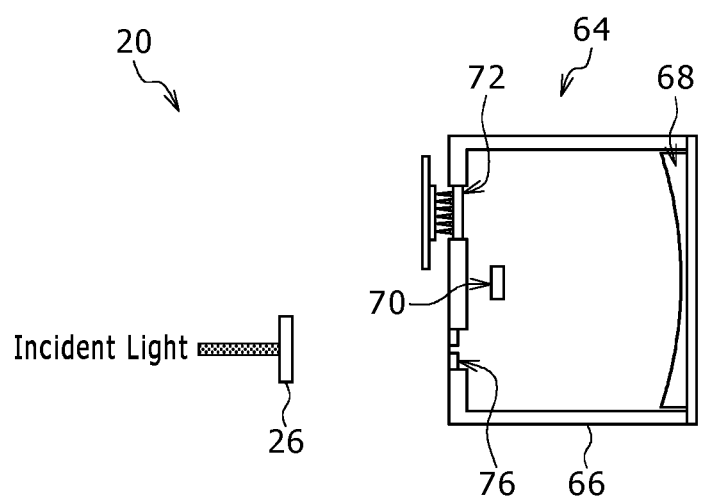
FIG. 6 is an illustration similar to that of FIG. 5 in which the corresponding electrochromic device has been switched to a different state to block transmittance of light to the corresponding sensor device, according to an embodiment of the disclosure.

By way of example, a sensor device 64 may be positioned along the corresponding optical fiber line 24 to selectively receive light which passes through the fluid sample 62 in sample chamber 56, as illustrated in FIGS. 5 and 6. In some embodiments, the sensor device 64 may be positioned on an opposite side of the corresponding electrochromic device 26 relative to sample chamber 56. The sensor device 64 may comprise many types of sensors able to obtain information on the sample fluid via analysis of the light passing through the corresponding electrochromic device 26 to the sensor device 64. The data collected regarding fluid sample 62 also may be used to determine characteristics of formation 46. The sensor device 64 may be coupled with a suitable processing system, e.g. control system 28 and/or surface control system 36, to provide data to the processing system for further analysis.

According to an embodiment, the sensor device 64 may be in the form of a photodetector 66. In this type of embodiment, the sensor device 64 comprises a mirror 68, a grating 70, and an image sensor 72, as illustrated in FIG. 5. Light from light source 22 passes through fluid sample 62, along optical fiber line 24, through the corresponding electrochromic device 26, and into an interior 74 of sensor device 64 via a slit 76 or other suitable opening.

When the light 60 enters sensor device 64, mirror 68 is oriented to reflect the light 60 back to grating 70 which effectively causes a spectrum of light 78 indicative of characteristics of fluid sample 62. In this example, the spectrum of light 78 is reflected back to mirror 68 which, in turn, reflects the spectrum of light 78 to image sensor 72. The image sensor 72 detects the spectrum of light 78 and provides data regarding the spectrum to control system 28 or to another suitable processing system for analysis. By way of example, the control system 28 may be used to analyze the spectrum data provided by image sensor 72 and to compare such data to different spectra so as to characterize properties of the fluid sample 62.

When the testing process is completed, the corresponding electrochromic device 26 is actuated via control system 28 to prevent further passage of light, as illustrated in FIG. 6. This process may be repeated for a plurality of samples 62 taken at single or plural locations along borehole 40. In this type of embodiment, the outgoing light 58 along source fiber bundle 52 also may be selectively controlled and used for a variety of purposes, such as providing reference readings, providing light to a different type of sensor device 64, or for other uses depending on the parameters of a given application.

Additionally, some embodiments may utilize a single optical fiber line 24 or a greater number of optical fiber lines 24 coupled with additional and/or other types of sensor devices 64 or other components. Regardless, optical system 20 enables control over optical transmittance while also enabling optical path selection between a plurality of optical fiber lines 24 without use of mechanical moving parts. In various applications, the optical system 20 also may be used to control measurement frequency without mechanically moving parts by selectively actuating the appropriate electrochromic devices 26.

It should be noted the system 20 may use a variety of light sources 22, optical fiber lines 24, electrochromic devices 26, and sensor devices 64. By way of example, the light source 22 may comprise various types of light sources, including incandescent light sources, LED light sources, or other suitable light sources utilized individually or in various arrangements. Similarly, various types of electrochromic devices 26 may be utilized, including electrochromic mirrors, or other electrochromic devices which may be switched between light transmitting and light blocking states according to appropriate input signals, e.g. electrical input signals.

Additionally, the sensor device or devices 64 may comprise many types of photodetectors or other sensors able to obtain characteristic data from fluid sample 62 based on the light signals traveling through the fluid sample 62. The sensor device 64 may comprise individual photodetectors or a plurality of photodetectors. In some applications, the optical system 20 also may utilize various filters, e.g. optical bandpass filters, to facilitate analysis of hydrocarbon mixtures or other fluid samples via sensor device(s) 64 located in the downhole environment.

The optical system 20 may be used in many types of well tools 32, e.g. logging tools. However, the optical system 20 may be used various other types of tools, including non-well related tools, to provide, for example, control over optical transmittance and optical path selection without utilizing moving mechanical parts. The configuration and components of optical system 20 may be adjusted according to the desired application.

In fluid sampling applications, the optical system 20 may incorporate the fluid sample chamber or chambers 56 in a variety of locations and configurations. Additionally, the optical system 20 may incorporate various types of sensor devices 64 for use with the sample chamber(s) 56 or with other components. The control and processing systems, e.g. control systems 28, 36, may be configured for processing various types of data received from the corresponding sensor devices 64 to provide information on the sample reservoir fluid, other sample fluid, or other characteristics detected via monitoring of the light signal.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for controlling optical transmittance, comprising:
    a light source;
    a plurality of optical fiber bundles in optical communication with the light source;
    a plurality of electrochromic devices, at least one of the electrochromic devices being positioned along each optical fiber bundle of the plurality of optical fiber bundles;
    a sample chamber disposed along at least one of the optical fiber bundles; and
    a control system coupled with the plurality of electrochromic devices to selectively control optical transmittance through individual electrochromic devices without moving mechanical parts and according to electrical inputs supplied to the individual electrochromic devices.

2. The system as recited in claim 1, wherein the plurality of electrochromic devices comprises electrochromic mirrors.

3. The system as recited in claim 1, wherein the control system is configured to control optical path selection through the plurality of optical fiber bundles.

4. The system as recited in claim 1, where the sample chamber is positioned between the light source and a corresponding electrochromic device of the plurality of electrochromic devices.

5. The system as recited in claim 4, further comprising a sensor device disposed on an opposite side of the corresponding electrochromic device relative to the sample chamber.

6. The system as recited in claim 5, wherein the sensor device comprises a photodetector.

7. The system as recited in claim 5, wherein the sensor device comprises a mirror, a grating, and an image sensor.

8. The system as recited in claim 1, wherein the sample chamber is part of a downhole fluid analyzer tool.

9. A system, comprising:
    a well tool having a fluid analyzer, the fluid analyzer comprising:
        a light source;
        an optical fiber line in optical communication with the light source;
        a fluid sample chamber disposed along the optical fiber line; and
        an electrochromic device disposed along the optical fiber line, the electrochromic device being controllable via an electrical input to change a color of the electrochromic device, thus changing an optical transmittance along the optical fiber line.

10. The system as recited in claim 9, wherein the optical fiber line comprises a plurality of optical fiber lines and the electrochromic device comprises a plurality of electrochromic devices.

11. The system as recited in claim 10, wherein the electrochromic devices of the plurality of electrochromic devices are individually controllable to enable optical path selection along selected optical fiber lines of the plurality of optical fiber lines.

12. The system as recited in claim 9, wherein the fluid sample chamber is positioned between the light source and the electrochromic device.

13. The system as recited in claim 9, wherein the fluid analyzer further comprises a sensor device disposed on an opposite side of the electrochromic device relative to the fluid sample chamber.

14. The system as recited in claim 13, wherein the sensor device comprises a photodetector.

15. The system as recited in claim 13, wherein the sensor device comprises a mirror, a grating, and an image sensor.

16. A method, comprising:
    coupling a light source with a plurality of optical fiber lines;
    mounting electrochromic devices along the plurality of optical fiber lines;
    providing a sample chamber along at least one of the optical fiber lines; and
    operating the electrochromic devices to control optical transmittance and optical path selection along the plurality of optical fiber lines.

17. The method as recited in claim 16, further comprising combining the light source, the electrochromic devices, and the sample chamber into a well tool.

18. The method as recited in claim 17, further comprising moving the well tool downhole along a borehole to a desired sampling location.

* * * * *